United States Patent [19]

Tachika

[11] Patent Number: 5,020,075
[45] Date of Patent: May 28, 1991

[54] DIRECT SEQUENCE SPREAD SPECTRUM MODULATION APPARATUS

[75] Inventor: Hisao Tachika, Amagasaki, Japan

[73] Assignee: Mitsubishi Denki Kabushiki Kaisha, Tokyo, Japan

[21] Appl. No.: 402,882

[22] Filed: Sep. 5, 1989

[30] Foreign Application Priority Data

Sep. 6, 1988 [JP] Japan ............... 63-222757

[51] Int. Cl.$^5$ ............................................. H04L 27/12
[52] U.S. Cl. ........................................ 375/1; 375/115;
370/18; 370/107; 332/101
[58] Field of Search ............... 375/1, 115; 380/34,
380/46; 370/18, 107; 332/100–102

[56] References Cited

U.S. PATENT DOCUMENTS

| | | | |
|---|---|---|---|
| 4,355,399 | 10/1982 | Timor | 375/1 |
| 4,383,322 | 5/1983 | Halpern et al. | 375/1 |
| 4,383,323 | 5/1983 | Timor | 375/1 |
| 4,527,275 | 7/1985 | Russell | 375/1 |
| 4,894,841 | 1/1990 | Martinino et al. | 375/1 |

FOREIGN PATENT DOCUMENTS

| | | |
|---|---|---|
| 59-33962 | 2/1984 | Japan . |
| 61-67353 | 4/1986 | Japan . |
| 61-501004 | 5/1986 | Japan . |
| 8600767 | 1/1986 | World Int. Prop. O. . |

*Primary Examiner*—Nelson Moskowitz
*Assistant Examiner*—Bernarr E. Gregory

[57] ABSTRACT

In a direct sequence spread spectrum modulation apparatus, the data of predetermined bit inserted in a phase shift time data period provided between the respective PN codes, or a predetermined bit at the latter half portion of the PN code, is phase shifted in accordance with the data to be modulated. The thereby conducts spread spectrum and data modulation.

14 Claims, 8 Drawing Sheets

DIRECT SEQUENCE SPREAD SPECTRUM MODULATION APPARATUS

FIELD OF THE INVENTION

The present invention relates to a direct sequence spread spectrum modulation apparatus which spreads the spectrum by MSK (Minimum Shift Keying) or GMSK (Gaussian MSK) modulation.

BACKGROUND OF THE INVENTION

FIG. 8 shows a system diagram of a prior art DS-PSK (Direct Sequence—Phase Shift Keying) modulation apparatus and FIG. 9 shows a system diagram of a prior art DS-PSK demodulation apparatus, which are disclosed in page 18.

In FIG. 8, reference numeral 1 designates a data input terminal. Reference numeral 2 designates a psuedo noise (hereinafter referred to as "PN") code generator. Reference numeral 3 designates a mixer which spreads the spectrum by multiplying the data by the PN code. Reference numeral 4 designates a PSK modulator which modulates the output of the mixer 3. Reference numeral 5 designates an output terminal for the spread spectrum signal.

In FIG. 9, reference numeral 6 designates an input terminal for received spread spectrum signal. Reference numeral 7 designates a PN code generator which generates a PN code which is synchronized with the output of PN code generator 2 at the transmitter's side. Reference numeral 8 designates a mixer which demodulates the received spread spectrum signal to the narrow band PSK signals multiplying by the PN code which is generated by the PN code generator 7 at the receiver's side. Reference numeral 9 designates a PSK demodulator. Reference numeral 10 designates an output terminal for reproduced data.

FIG. 11 shows waveforms of the respective portions of DS-PSK modulator and demodulator. In FIG. 11, reference numeral 11 designates an input data. Reference numeral 12 designates a PN code for transmission. Reference numeral 13 designates a mixer output for transmission. Reference numeral 14 designates a PSK modulation output which is also input to the PSK demodulator. Reference numeral 16 designates a mixer output for receiving. Reference numeral 17 designates a reproduced data output.

The operation of this device will be described with reference to FIG. 11.

The input data 11 and the PN code 12 are spread by the mixer 3, and a mixer output 13 is obtained. This mixer output 13 is modulated by the PSK modulator 4, to result in a PSK modulated waveform 14.

This PSK modulated waveform 14 is input to the DS-GMSK demodulator and is demodulated to the narrow band PSK signals by multiplying it by the receiver's PN code 15 at the receiver's mixer 8, to result in a mixer output 16. This mixer output 16 is demodulated by the PSK demodulator 9, to result in a reproduced data 17.

Next, the DS-MSK and DS-GMSK modulator and demodulator which are easily assumed from the above-described DS-PSK system will be described.

FIG. 12 show a DS-MSK modulator or a DS-GMSK modulator modulated by PSK as data modulation (hereinafter referred to as DS-MSK/GMSK-PSK) and FIG. 13 shows that modulated by FSK as data modulation (hereinafter referred to as DS-MSK/GMSK-FSK) respectively, which are easily assumed from the DS-PSK modulator and demodulator, and FIG. 14 shows a DS-MSK or DS-GMSK demodulator. In these figures, reference numeral 18 designates a MSK or GMSK modulator. Reference numeral 18a designates a VCXO (Voltage Controlled Crystal Oscillator). Reference numerals 1 to 10 designate the same elements as those shown in FIG. 8.

FIGS. 15 and 16 show waveforms of respective portions of DS-MSK/GMSK-PSK modulator and DS-MSK/GMSK-FSK modulator of FIGS. 12 and 13, respectively.

The device will operate as follows. In FIG. 12, the output 33 of MSK or GMSK modulator 18 which is modulated by the PN code 32 and the input data 31 are multiplied with the output 33 of modulator 18 at the mixer 3. On the other hand, in FIG. 13, VCXO 18a is used as an oscillator of MSK or GMSK modulator 18, and the VCXO output 36 is spread by the PN code 37 at the mixer 18b, to result in a DS-MSK/GMSK FSK (Frequency Shift Keying) modulated waveform 38.

In FIG. 14, the demodulation of spread spectrum signals is conducted to the dispersion signal by mixing an MSK dispersion signal or GMSK received signal by mixing an MSK or GMSK signal modulated by the same sequence as the PN code generator in the transmitter's side. Modulation apparatus of FIG. 12, a PSK signal is obtained and for the output signals of the modulation apparatus of FIG. 13, an FSK reproduced signal is obtained.

The prior art DS-MSK and DS-GMSK modulation apparatus are constituted as described above, and in the system of FIG. 12, a steep phase shift arises at the changing point of data. This deteriorates the characteristics of MSK and GMSK signals, the systems having less extra band spectrum and less extra band noise. Furthermore, in the system of FIG. 13, since a frequency modulation is executed to the carrier, the extraction of carrier from the input signal is difficult. Further, VCXOs are required in the MSK or GMSK modulators.

SUMMARY OF THE INVENTION

It is an object of the present invention to obtain a direct sequence spread spectrum modulation apparatus capable of being constructed in a small size and at low cost without deteriorating the characteristics of MSK or GMSK modulations.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to a direct sequence spread spectrum modulation apparatus of the present invention, while conducting spread spectrum of MSK or GMSK signal, a modulation is executed to the output of MSK or GMSK modulator such that it is of 0 or $\pi$ phase. This is achieved by replacing a predetermined bit which is inserted in the phase shift time data period provided between PN codes, or a predetermined bit at the latter half portion of PN code, by data which is to be modulated. Therefore, the modulated output will not be affected by phase discontinuity or carrier modulation.

Therefore signals of only MSK or GMSK modulations are obtained by an apparatus of simple construction.

DETAILED DESCRIPTION OF THE PREFERRED EMBODIMENTS

An embodiment of the present invention will be described in detail with reference to the drawings.

Figure 1:
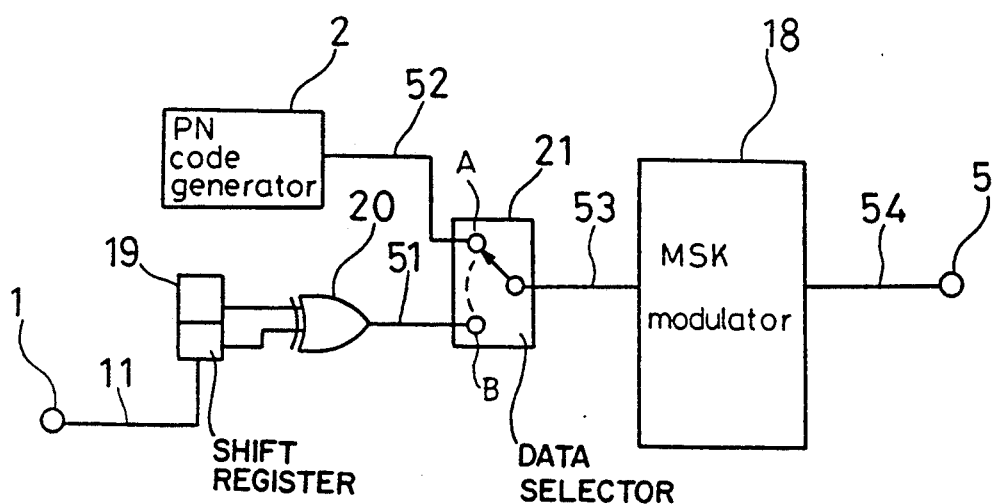
FIG. 1 is a diagram showing a direct sequence spread spectrum modulation apparatus according to a first embodiment of the present invention.

FIG. 1 shows a direct sequence spread spectrum modulation apparatus according to a first embodiment of the present invention. In FIG. 1, reference numeral 1 designates a data input terminal. Reference numeral 2 designates a PN code generator. Reference numeral 5 designates spread spectrum signal output terminal. Reference numeral 19 designates a 2 bit shift register. Reference numeral 20 designates an exclusive OR circuit. Reference numeral 21 designates a data selector.

Figure 2:
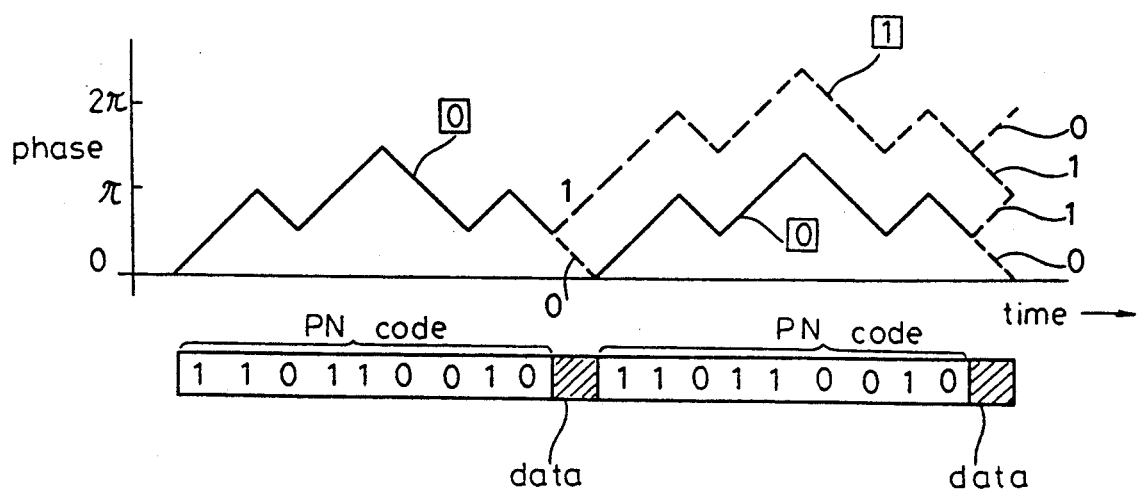
FIG. 2 is a diagram showing the relationship between the DS-MSK input data and the phase of the PN code according to the first embodiment.

FIG. 2 shows relationship between the DS-MSK data input and the DS-MSK modulation signal in this embodiment. In FIG. 2, the real line shows phase change in the DS-MSK signal when data "0" is MSK modulated by the PN code "110110010", and the dotted line shows phase change in the DS-MSK signal when data "1" is MSK modulated by the phase which is different by " " from the phase of data "0".

Figure 3:
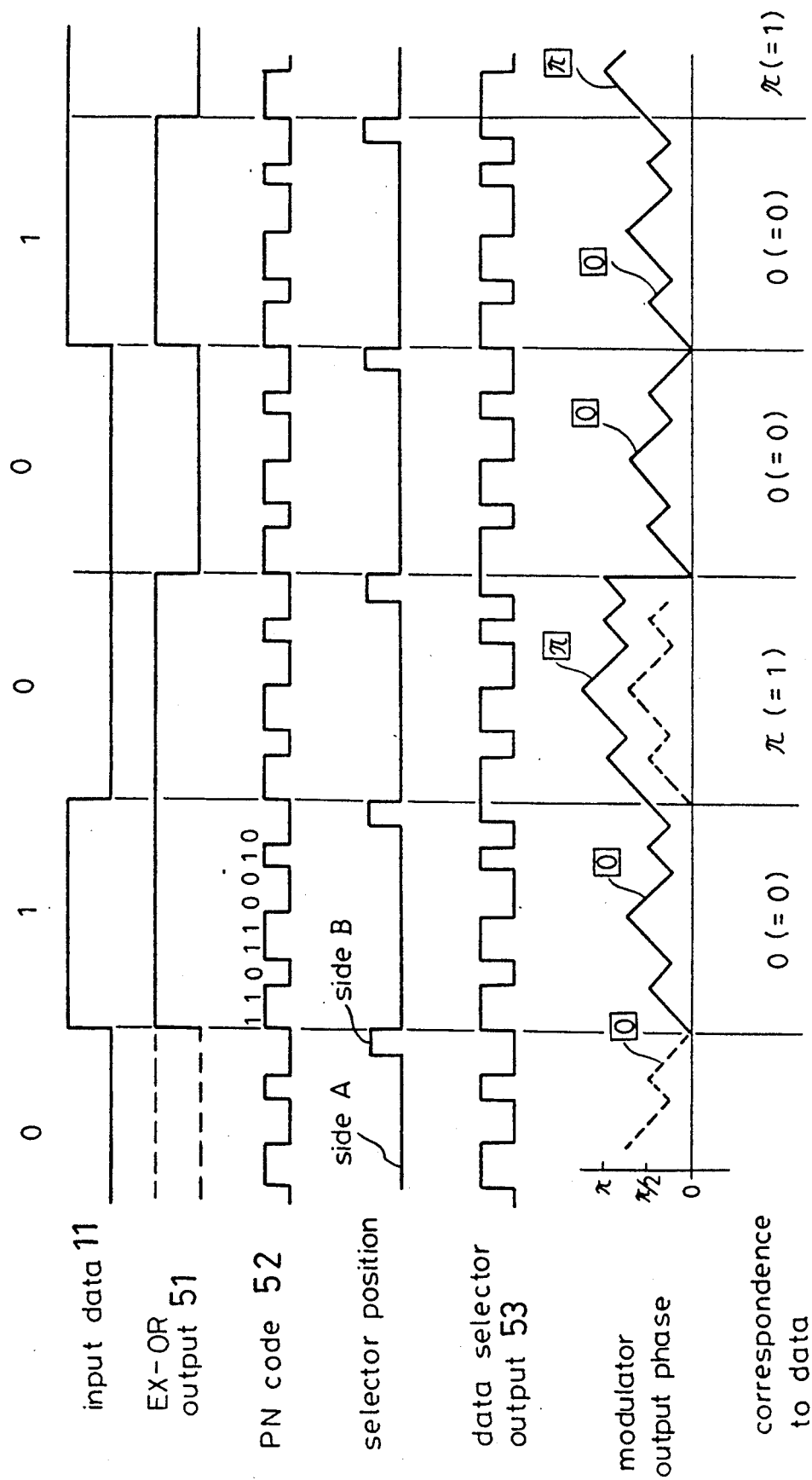
FIG. 3 is a diagram showing waveforms obtained at the respective portions of FIG. 1.

FIG. 3 shows waveforms of respective portions of FIG. 1.

The device will operate as follows.

A PN code "110110010" is input to the DS-MSK modulator 18, and the PN code is modulated to be of 0 phase against data to be "0" and to be of $\pi$ phase against data to be "1".

Now, it is assumed that the PN code is input to the DS-MSK modulator 18 so that the PN code is of 0 phase and that the number of "1" in the PN code is larger than the number of "0" by 1. Further, the phase of the final bit of the PN code is $\pi/2$. Then, the initial bit of the next PN code is only to be changed by $+\pi/2$ when the data which is to be modulated next is "1", and by $-\pi/2$ when it is "0".

That is, when the final bit of PN code is "0", the phase of next PN code is of 0 phase when the data to be modulated is "0" and is of $\pi$ phase when the data to be modulated is "1". When the final bit of by-one previous PN code is "138, the phase of next PN code is of $\pi$ phase when the data to be modulated is "0" and is of 0 phase when the data to be modulated is "1". This is represented in the following table 1.

TABLE 1

| phase of PN code | phase of next PN code | data | phase |
|---|---|---|---|
| 0 | 0 | 0 | 0 |
|   | 1 | 1 | $\pi$ |
| 1 | 0 | 1 | $\pi$ |
|   | 1 | 0 | 0 |

In order to realize the above-described operation, the operation of table 1 is conducted by the 2 bit shift register 19 and the exclusive OR circuit 20 in the construction of FIG. 1. Further after the transmission of PN code 2 is concluded, the data selector 21 is turned to the side of the exclusive OR circuit 20.

Figure 9:
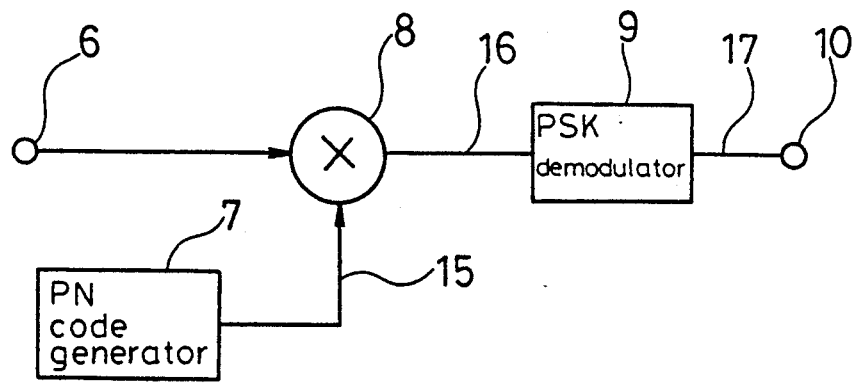
FIG. 9 is a diagram showing a DS-PSK demodulator according to the prior art.
Figure 10:
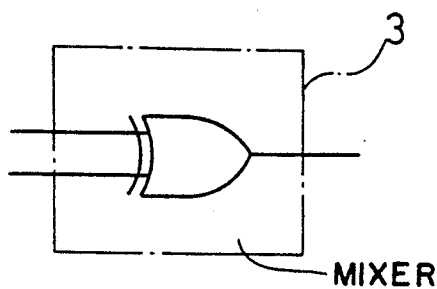
FIG. 10 is a diagram showing an example of a DS-PSK mixer according to the prior art.
Figure 11:
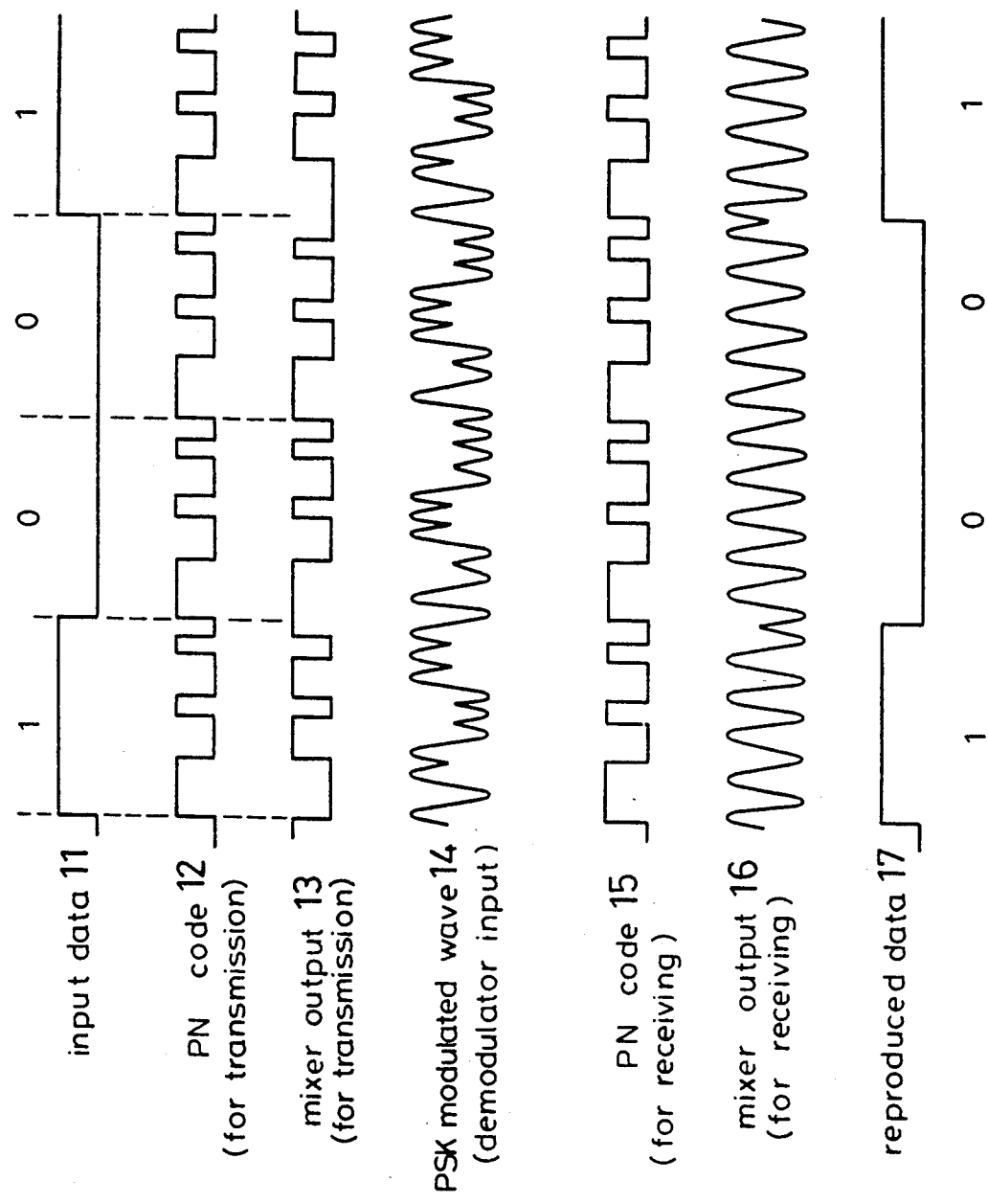
FIG. 11 is a timing chart for explaining the operation of DS-PSK system according to the prior art.
Figure 12:
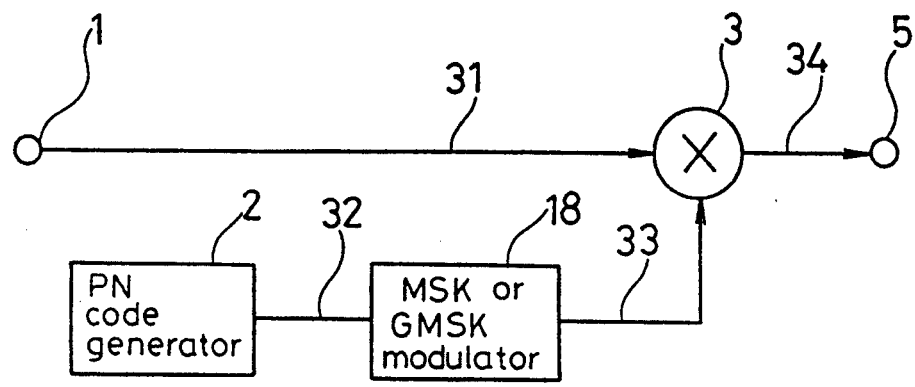
FIGS. 12 and 13 are diagrams showing a DS-MSK or DS-GMSK modulator which are assumed from the prior art DS-PSK modulation system.
Figure 13:
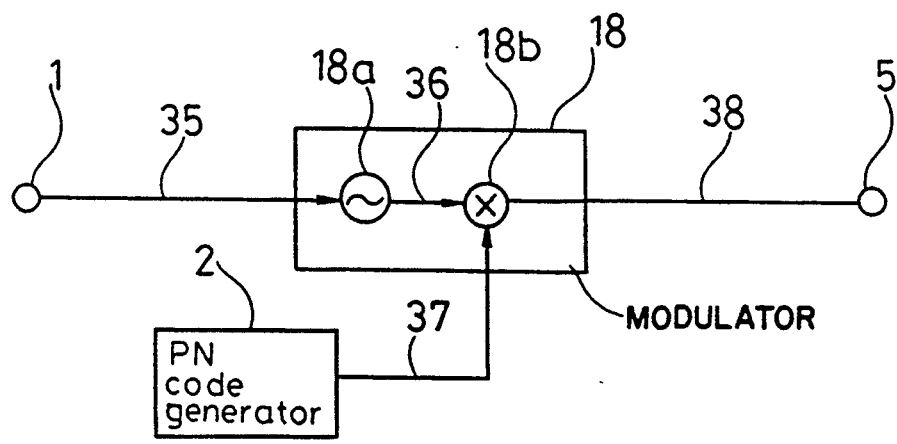
Figure 14:
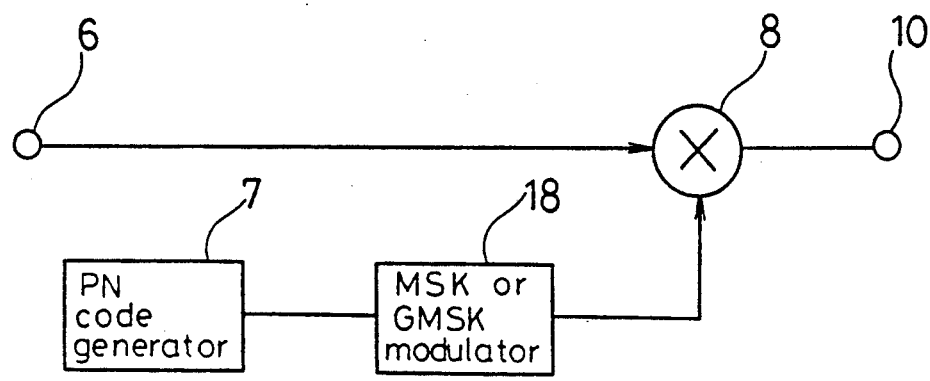
FIG. 14 is a diagram showing a DS-MSK or DS-GMSK demodulator which is assumed from the prior art DS-PSK modulation system.
Figure 15:
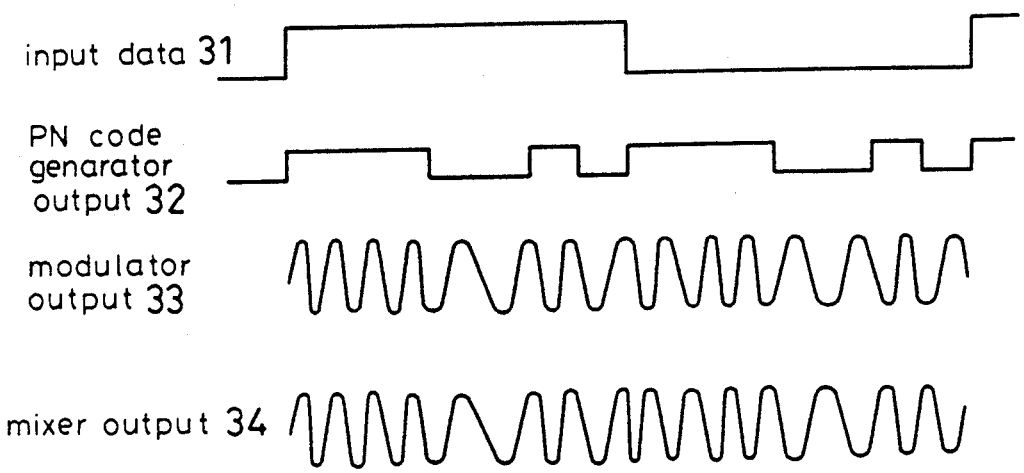
FIG. 15 is a timing chart showing waveforms of respective portions of the modulator of FIG. 8.
Figure 16:
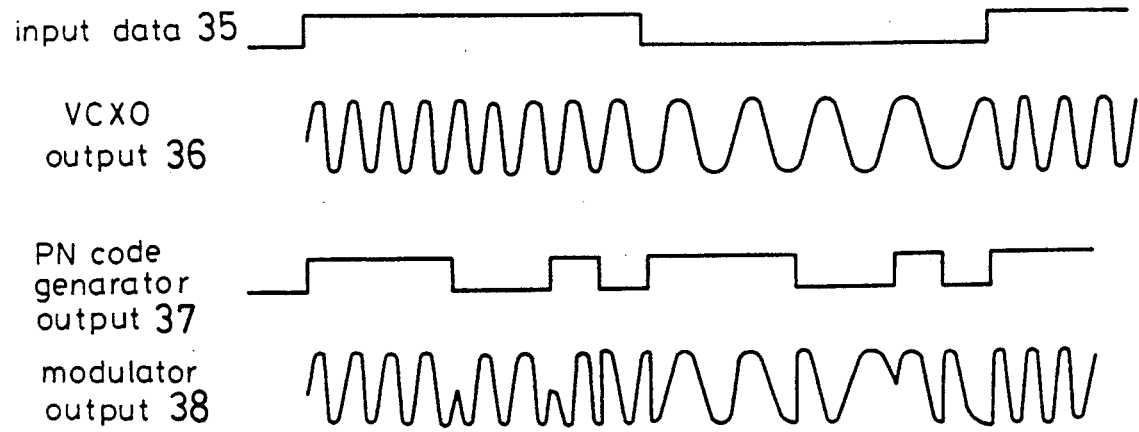
FIG. 16 is a timing chart showing waveforms of respective portions of the demodulator of FIG. 9.

The demodulation can be conducted by the prior art demodulator shown in FIG. 9, and then, the reproduced data 17 corresponding to the 0 or $\pi$ phase is obtained at the output of the demodulator 10.

In the above-illustrated embodiment is a case where the number of "1" in the PN code is larger by one than the number of "0". That is, it is a case where the PN code is different by $\pi/2$ phase between the beginning and end of the PN code. However, in all cases where the difference between the numbers of "1" and "0" in the PN code is 1+4 N (N: integer), the logic is the same and the present invention can be applied as described above. To the contrary, when the difference in the numbers of "1" and "0" in the PN code is 3+4 N, the logic of table 1 should be replaced by the table 2.

Figure 4:
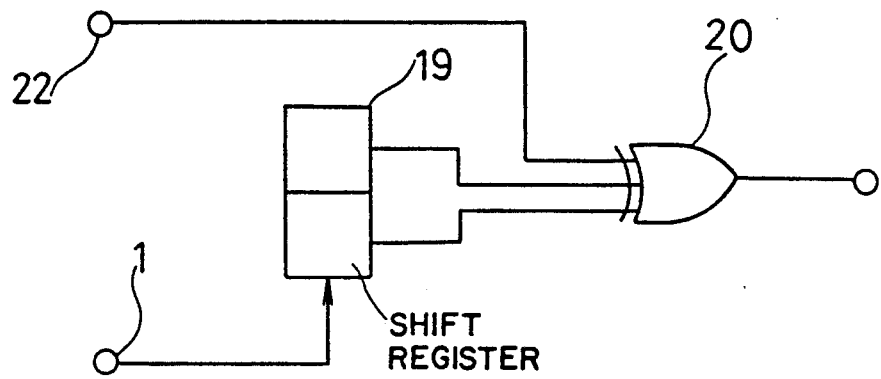
FIG. 4 is a diagram showing constructions of the shift register 19 and the exclusive OR circuit 20 when there is a difference of 3+4 N (N: integer) between the numbers "1" and "0" in the PN code, according to a second embodiment of the present invention.

FIG. 4 shows a circuit which easily realizes the switching of logic. In FIG. 4, reference numeral 22 designates an input terminal for a PN code distinguishing signal which is "0" when the difference between the numbers of "1" and "0" in the PN code is 1+4 N and which is "1" when it is 3+4 N.

TABLE 2

| phase of PN code | phase of next PN code | data | phase |
|---|---|---|---|
| 0 | 0 | 1 | $\pi$ |
|   | 1 | 0 | 0 |
| 1 | 0 | 0 | 0 |
|   | 1 | 1 | $\pi$ |

In the above-illustrated embodiment the system is defined as MSK or GMSK modulation system, but the system may be any π/4 phase modulation system with the same effects as described above being obtained.

In the above-illustrated embodiment, the phase shift time is provided between the respective PN codes and 1 bit inserted in the phase shift time data period being shifted. However, a plurality of bits in the phase shift time may be shifted.

Furthermore, the final one bit or a plurality of bits at the final portion of the PN code may be replaced in accordance with the code which is to be modulated. Then, the data transmission efficiency can be further enhanced with the same effects as described above.

Figure 5:
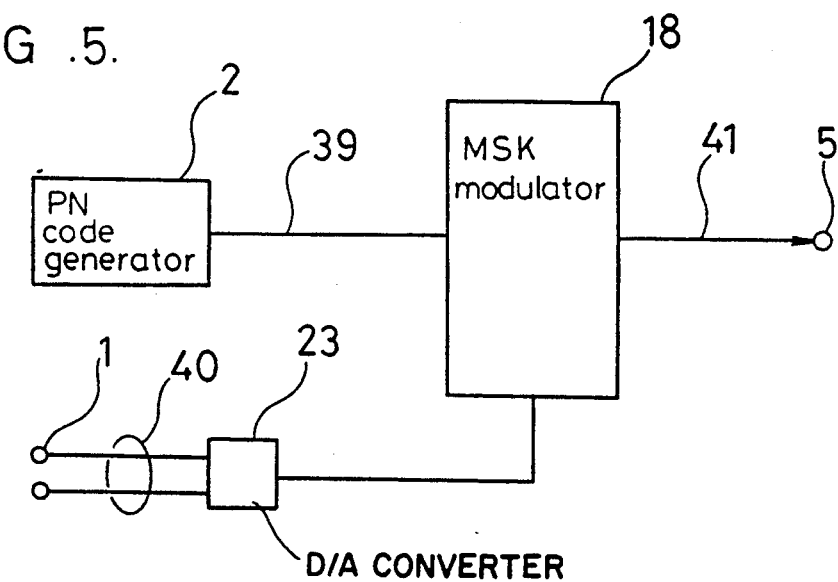
FIG. 5 is a diagram showing an apparatus of a multi-value modulation system according to the second embodiment of the present invention.
Figure 6:
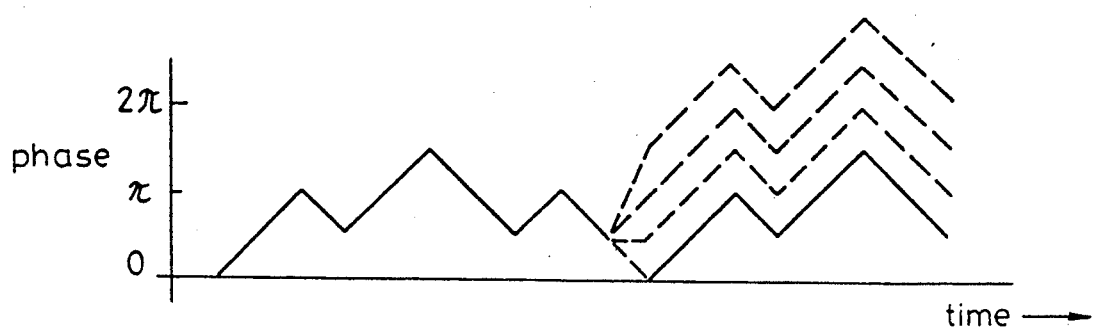
FIG. 6 is a diagram showing the relationship between the input data and the phase of the spread spectrum according to the second embodiment of the present invention.

FIG. 5 shows a second embodiment of the present invention. In this embodiment, phase variation modulation is executed between the PN code data in the spread spectrum system utilizing the phase modulation, whereby multi-phase data are transmitted.

Figure 7:
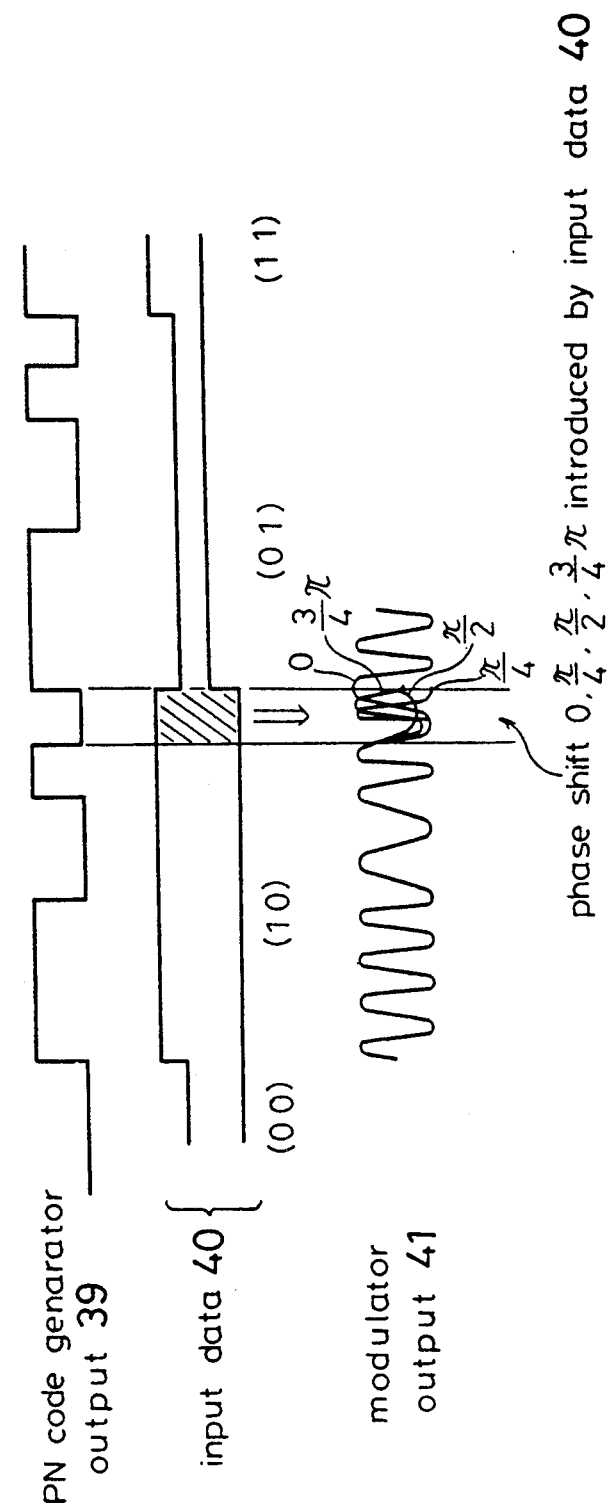
FIG. 7 is a diagram showing waveforms of the respective portions of modulator of FIG. 5.
Figure 8:
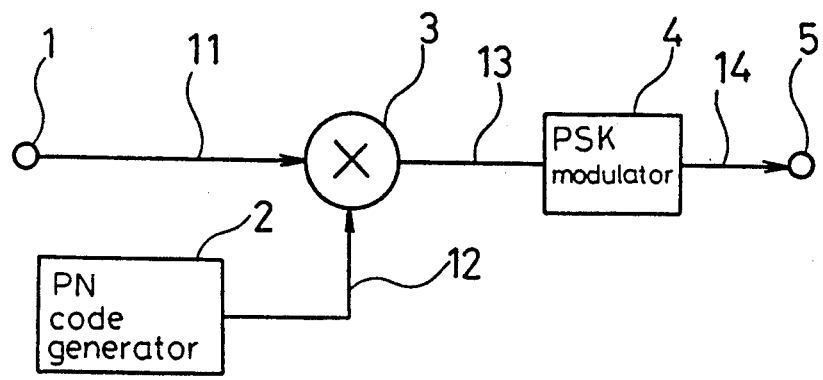
FIG. 8 is a diagram showing a DS-PSK modulator according to a prior art.

In FIG. 5, reference numeral 1 designates an n bit data input terminal and reference numeral 23 designates a D/A converter. In the data period shown in FIG. 5, it is controlled such that the next data is phase shifted by 0, π/4, π/2, or ¾. FIG. 7 shows waveforms of the respective portions of FIG. 5.

As is evident from the foregoing description, according to the direct sequence modulation apparatus of the present invention, the spread spectrum and the data modulation are conducted at the same time by phase shifting a predetermined bit inserted in the phase shift time data period provided between the PN codes, or a predetermined bit at the latter half portion of PN code, in accordance with the data to be modulated. Therefore, the apparatus can be constructed in a small size and at a low cost, and furthermore, dispersion outputs, which are not deteriorated in the MSK or GMSK properties are obtained.

What is claimed is:

1. A direct sequence spread spectrum modulation apparatus, comprising:
    data input means for sequentially inputting a plurality of data bits, each having a data value, to be modulated;
    spread code generating means for sequentially generating a plurality of psuedo noise codes, each including a plurality of sequential bits;
    selection means, operatively connected to said data input means and said spread code generating means, for alternatively selecting and subsequently outputting, subsequently generated and input pseudo noise codes and data bits, respectively; and
    spread spectrum modulation means, operatively connected to said selection means, for receiving said sequentially output psuedo noise codes and data bits and for spread spectrum modulating each data bit by the preceding psuedo noise codes such that the last sequential bit of a received psuedo noise code is phase shifted by a first value from the first sequential bit and a subsequently received data bit is phase shifted, by said first value upon said data bit being of a first data value and is shifted by a second value, equal to the negative of said first value, upon said data bit being of a second data value to thereby achieve a gradually generated phase difference of π and O, respectively, in data modulation of a thus generated spread spectrum modulated signal.

2. The direct sequence spread spectrum modulation apparatus of claim 1, wherein said selection means further comprises:
    shift register means, operatively connected to said data input means, for serially receiving and subsequently shifting said plurality of input data bits to be modulated; and
    exclusive OR means, operatively connected to shift register means, for exclusively ORing parallel output of a plurality of data bits from said shift register means.

3. The direct sequence spread spectrum modulation apparatus of claim 2, wherein said shift register means is a 2 bit shift register.

4. The direct sequence spread spectrum modulation apparatus of claim 2, wherein said exclusive OR means includes 2 inputs for receiving two parallel output data bits.

5. The direct sequence spread spectrum modulation apparatus of claim 2, wherein polarity of the output of said selection means is switched dependent upon the difference between the numbers of logical "0" and "1" of the plural sequential bits in the psuedo noise code being 1+4 N or 3+4 N, wherein N is an integer.

6. The direct sequence spread spectrum modulation apparatus of claim 5, wherein the switching of said polarity is realized by said exclusive or means which has 2 data inputs and a third input for inputting a difference signal to said exclusive OR means.

7. The direct sequence spread spectrum modulation apparatus of claim 5, wherein the spread spectrum modulation means is a GMSK modulator.

8. The direct sequence spread spectrum modulation apparatus of claim 7, wherein demodulation of said direct sequence spread spectrum modulation is conducted by mixing said GMSK modulated pseudo noise code and said direct sequence spread spectrum modulated signal.

9. The direct sequence spread spectrum modulation apparatus of claim 1, wherein the spread spectrum modulation means is an MSK modulator.

10. The direct sequence spread spectrum modulation apparatus of claim 9, wherein demodulation of said direct sequence spread spectrum modulation is conducted by mixing the MSK modulated psuedo noise code and the direct sequence spread spectrum modulated signal.

11. The direct sequence spread spectrum modulation apparatus of claim 1 wherein the received data bit is phase shifted by the spread spectrum modulation means by π/2 during modulation if the data bit is of said first data value and is phase shifted by the spread spectrum modulation means by (-) π/2 during modulation if the data bit is of a second data value, different from said first data value.

12. The direct sequence spread spectrum modulation apparatus of claim 11, wherein said first data value equals logical "1" and said second data value equals logical "0".

13. The direct sequence spread spectrum modulation apparatus of claim 1, wherein each sequentially generated pseudo noise code includes a plurality of sequentially arranged logical "1"s and "0"s as its sequential bits, and wherein the first value, equal to the phase shifting of the last sequential bit is dependent upon the number of logical "1"s and the number of logical "0"s in the pseudo code.

14. The direct sequence spread spectrum modulation apparatus of claim 13 wherein said first value equals π/2 upon said number of logical "1"s in the pseudo noise code being greater than the number of logical "0"s.

* * * * *